United States Patent [19]
Guigon et al.

[11] Patent Number: 5,263,062
[45] Date of Patent: Nov. 16, 1993

[54] PROCESS AND APPARATUS FOR DISMANTLING THE INTERNAL EQUIPMENT OF A WATER-COOLED NUCLEAR REACTOR

[75] Inventors: Jean-Pierre Guigon, Givry; Paul Jacquier, Tassin La Demi-Lune, both of France

[73] Assignee: Framatome, Courbevoie, France

[21] Appl. No.: 836,809

[22] Filed: Feb. 19, 1992

[30] Foreign Application Priority Data

Feb. 19, 1991 [FR] France ............................ 91 01957

[51] Int. Cl.$^5$ ............................................ G21C 19/00
[52] U.S. Cl. .............................................. 376/261
[58] Field of Search ............ 376/261; 976/DIG. 272, 976/DIG. 273, DIG. 274

[56] References Cited

U.S. PATENT DOCUMENTS

| | | | |
|---|---|---|---|
| 4,643,845 | 2/1987 | Omote et al. | 376/261 |
| 4,648,989 | 3/1987 | Klein | 376/261 |
| 4,731,219 | 3/1988 | Beneck et al. | 376/261 |

FOREIGN PATENT DOCUMENTS

| | | |
|---|---|---|
| 2506993 | 5/1982 | France . |
| 2523755 | 3/1983 | France . |
| 2600202 | 6/1986 | France . |
| 2092049 | 8/1982 | United Kingdom . |

OTHER PUBLICATIONS

Derwent file supplier WPIL–Derwent Publications, London UK JP-A-60157095 (Hitachi).

*Primary Examiner*—Donald P. Walsh
*Assistant Examiner*—Frederick H. Voss
*Attorney, Agent, or Firm*—Pollock, Vande Sande & Priddy

[57] ABSTRACT

The dismounting and/or cutting of each of the components (6) of the internal equipment fastened in the vessel (4) of the reactor are carried out underwater within the vessel (4). Metal elements (12) separated from the vessel (4) are obtained and are successively extracted from the vessel and then compacted underwater in a compacting press. The metal elements (36) obtained after the compacting are deposited underwater in a storage and transport container (37). The dismantling apparatus comprises in particular a handling and cutting assembly (11) which makes it possible to carry out the cutting of cylindrical portions of the core shroud (6) of the reactor and the transport of the portions (12) into the compacting press (34).

7 Claims, 2 Drawing Sheets

5,263,062

PROCESS AND APPARATUS FOR DISMANTLING THE INTERNAL EQUIPMENT OF A WATER-COOLED NUCLEAR REACTOR

FIELD OF THE INVENTION

The invention relates to a process and an apparatus for dismantling the internal equipment of a water-cooled nuclear reactor.

BACKGROUND OF THE INVENTION

Water-cooled nuclear reactors comprise a vessel containing the core of the reactor and connected to the reactor cooling circuit in which the cooling water circulates.

The internal equipment, consisting of various components fastened the vessel, makes it possible in to ensure that the core assemblies are supported and retained and that the cooling water is channelled within the vessel.

This internal equipment comprises in particular a core shroud consisting of a shell fastened coaxially with the vessel in the form of a generally cylindrical body closed by domed bottoms and arranged with its axis in the vertical direction.

The internal equipment of the reactor, which equipment is in contact with the cooling fluid and exposed to the radiation emitted by the reactor core, is highly activated and contaminated after the reactor has been in operation for some time.

As regards power stations which have reached the end of their lives and which require a complete shutdown, the past solution has been to leave these power stations in their existing state and to allow the activity of the constituent materials of their components to decrease, for the purpose of subsequently dismounting them under conditions more satisfactory than those at the time of the shutdown, without the need to employ complex remote-controlled tools.

Since the number of power stations put out of industrial operation is expected increase appreciably, it is necessary to consider dismantling these power stations so that the site where they are built can be restored to its original state.

While dismantling of the conventional part of the power station presents no particular problem, the dismantling of the part of the power station constituting the actual nuclear reactor, and particularly the internal equipment of the vessel, poses problems difficult to solve in view of the radioactive emissions of the constituent materials of the reactor components.

The reactor vessel is arranged inside a vessel well formed in a concrete structure which also delimits one or more pools arranged above the upper level of the vessel.

After permanent shutdown and cooling of the reactor, the pool is filled with water and the vessel cover is removed.

The underwater unloading of the core assemblies and the disposal of these assemblies, for example to reprocessing factories, are then carried out.

It is then necessary to dismantle and dispose of the internal equipment of the vessel, and these operations have to be conducted under a large depth of water because the internal equipment is highly irradiated.

The dismantling of the internal equipment must therefore be controlled remotely from the upper edge of the reactor pools, after these pools have been filled to their maximum level.

The various components of the internal equipment are dismounted and/or cut underwater inside the vessel, so as to obtain elements which are separated from the vessel and the disposal of which is carried out inside casks or containers.

It is possible, as a result of mechanical, thermal or electrochemical cutting of the components of the internal equipment inside the vessel, to obtain fragments which are sufficiently small to be introduced into the casks or containers and to be stored in these without a subsequent volume-reducing operation. However, such cutting techniques give rise to the formation of a volume of radioactive waste which is proportional to the cutting lengths. Conforming the separate elements of the internal equipment to the sizes of the casks or containers by cutting is therefore liable to produce a large volume of waste of very high activity, the recovery and processing of which may prove very difficult.

It is consequently preferable to employ techniques for bringing the fragments of components of the internal equipment extracted from the vessel to an appropriate size which can be put into practice without the removal of material.

Hot or cold cracking of the components or elements of the internal equipment has been considered, but this technique seems to be of limited use in view of the thicknesses of the parts or walls to be broken down by cracking and the adaptation of the process to the configuration of the fragmented parts. In fact, it is necessary to carry out an adjustment of the parameters of the cracking operation as a function of the configurations of each of the components of the internal equipment.

It has thus not been no known how to dismantle the internal equipment of a water-cooled nuclear reactor, allowing components or elements of the internal equipment to be brought to an appropriate size, by a method which is simple and which produces minimal radio active waste difficult to recover.

SUMMARY OF THE INVENTION

The object of the invention is, therefore, to provide a process for dismantling the internal equipment of a water-cooled nuclear reactor, involving underwater dismounting and/or cutting of each of the components of the internal equipment fastened in the vessel, in such a way as to obtain metal elements separated from the vessel, which process is simple to execute, can be carried out under very good safety conditions and generates a minimum quantity of small-size radioactive waste, such as chips, powders or filings.

To this end, each of the elements obtained is extracted successively from the vessel, compacted underwater, and the compacted element is then placed in a storage container.

BRIEF DESCRIPTION OF THE DRAWINGS

To facilitate comprehension of the invention, the process according to the invention and an apparatus for carrying it out will now be described by way of example.

DETAILED DESCRIPTION

Figure 1:
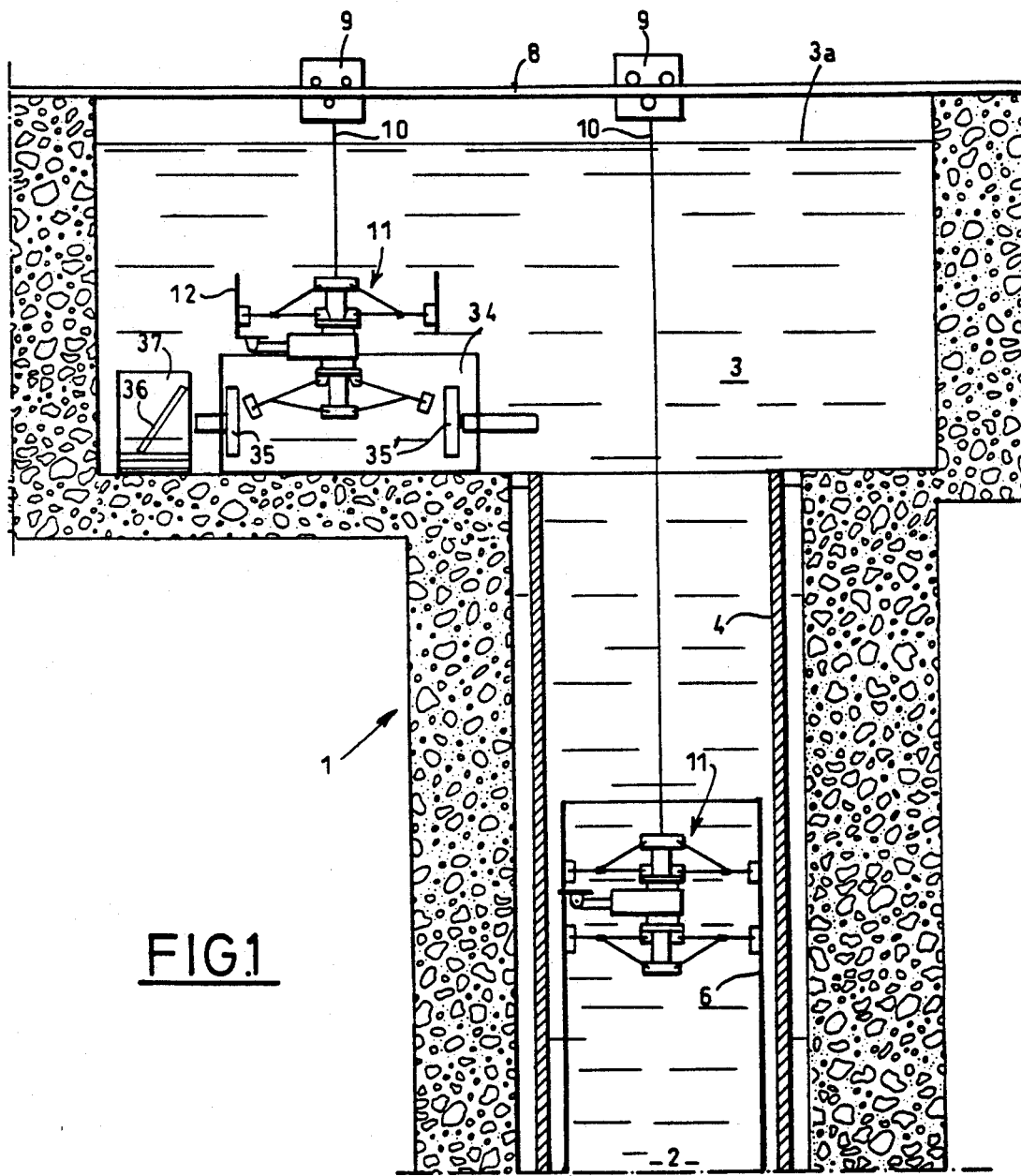
FIG. 1 is a sectional view in a vertical plane of part of the structure of a water-cooled nuclear reactor, in which the internal equipment of the vessel is dismantled by means of the process according to the invention.

FIG. 1 shows the concrete structure 1 of a nuclear reactor, in which is formed a vessel well 2 having an upper part opening into the pool 3 of the nuclear reactor. The reactor vessel 4 comprising a body of generally cylindrical shape is arranged inside the vessel well with its axis vertical.

FIG. 1 shows the vessel 4 and the structure 1 of the reactor during dismantling of the internal equipment of the vessel after permanent shutdown of the reactor.

After the permanent shutdown and cooling of the reactor, the vessel cover is dismounted and the core assemblies are extracted, introduced into transport containers and disposed of towards a reprocessing factory.

The vessel cover can be cut so as to form fragments which are placed in storage containers allowing their disposal towards a long-term storage site.

It is then necessary to carry out the dismounting and removal of the internal equipment of the vessel which particularly comprises a core shroud 6 fastened within and coaxially with vessel 4.

FIG. 1 illustrates means making it possible to execute the dismantling process according to the invention with regard to the dismantling of the core shroud 6 of the nuclear reactor which consists of a cylindrical shell of great thickness.

Dismantling of the internal equipment and in particular the core shroud 6 is carried out underwater, the vessel well 2, vessel 4 and reactor pool 3 being filled with water.

The level 3a of the water in the pool 3 corresponds to the maximum filling level of the pool.

Fastened to the upper edges of the pool are rails 8 for the movement of a travelling bridge 9 comprising a lifting winch, the suspension cable 10 of which carries an assembly 11 for the cutting and handling of elements of the upper internal equipment, which will be described with reference to FIG. 2.

The assembly 11 suspended on the end of the cable 10 is introduced into the core shroud 6 in such a way as to execute the cutting of elements of this shroud having the form of cylindrical portions 12 which, after being cut, can be transported underwater into a compacting press 34 located on the bottom of the pool 3 in a position adjacent to the vessel well 2.

As will be explained later, after being cut, the portion 12 of annular shape of the core shroud 6 remains fastened to the upper part of the apparatus 11 which is suspended on the cable 10.

The lifting winch of the handling device 9 makes it possible to ensure that the portion 12 is lifted as far as a level higher than the upper level of the well 2, within the pool 3.

By horizontal displacement of the carriage 9 of the travelling bridge, the portion 12 is then positioned above the press 34, and is introduced into the press 34 via its upper end open within the pool 3, in order to execute its compacting between the jaws 35 and 35' of the horizontally arranged press.

The element 12 taken from the core shroud 6 is compacted in a plurality of successive steps after the retraction of the tool 11, so as to obtain a compacted block 36 which can be introduced into a storage container 37 arranged in the bottom of the pool by means of a handling gripper tool controlled from the upper edge of the pool 3.

After container 37 has been filled with compacted blocks 36, it is disposed of towards a long-term storage site or a radioactive-waste processing unit.

To carry out the dismantling of the internal equipment of a nuclear reactor vessel, such as the vessel 4 shown in FIG. 1, the various components constituting the internal equipment and fastened inside the vessel 4 are dismounted and transported so as to be deposited in the compacting press 34 either in one piece, for the least bulky components, or after cutting making it possible to obtain successive portions of the component, for most bulky components, such as the core shroud 6.

In the case of a water-cooled nuclear reactor comprising, as main components of its internal equipment, an upper core grid, a lower core grid and a core shroud, a first step involves the dismounting and extraction of the upper core grid which is transported by a lifting and handling tool suspended on the bridge fastened above the pool, so as to be deposited within the frame of the press resting on the bottom of the pool.

The underwater compacting of the upper core grid as a whole is subsequently carried out, and the compacted piece obtained is placed in a container which is thereafter closed sealingly. The container is removed from the reactor block. The reactor pool is then cleaned so as to eliminate the radioactive substances which may have settled or been suspended in the water of the pool during the dismounting and compacting of the upper core grid.

The dismounting, extraction and compacting of the lower core grid are thereafter carried out in a virtually identical manner executed on the upper core grid.

For carrying out the dismounting and extraction of the lower core grid, use is made of a remote-controlled beam which is fastened to the cable of the lifting winch of the travelling bridge moving above the pool.

At the end of the compacting of the lower core grid, the pool is cleaned by filtering the water and eliminating the radioactive waste, before cutting of the core shroud and its removal in the form of elements.

A bin for the recovery of metal chips is placed on the bottom of the vessel 4, in order to recover the machining waste resulting from the cutting of the core shroud 6. The lower part of the core shroud 6 is also clamped and fastened inside the vessel.

To the end of the lifting cable 10 of the travelling bridge 9 moving above the reactor pool 3 is fastened a cutting and handling assembly 11 making it possible to cut of the core shroud 6 into annular portions 12, and to transfer the annular elements 12 into the compacting press 34, as described above.

Figure 2:
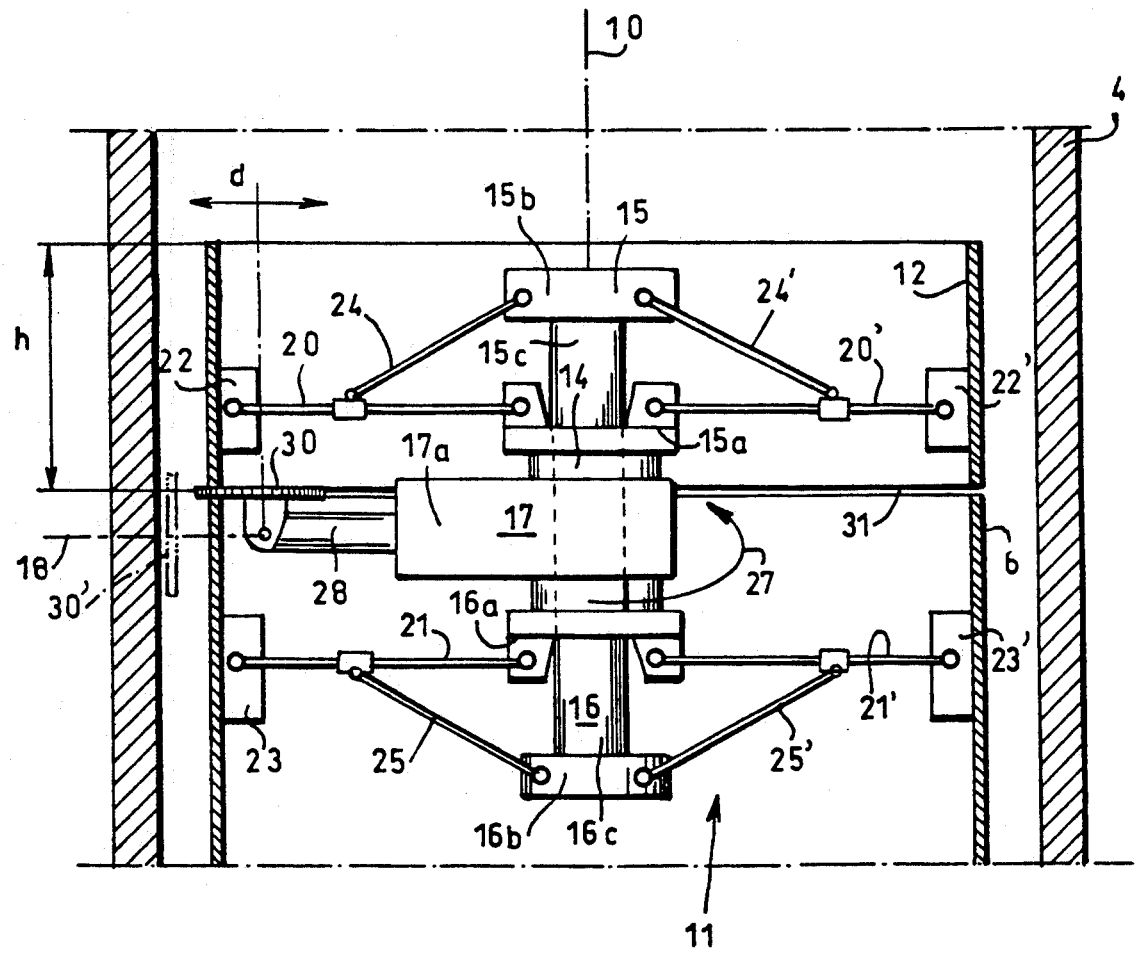
FIG. 2 is a vertical sectional and elevational view of a cutting and handling apparatus used for executing the process according to the invention

Reference will now be made to FIG. 2 to describe the cutting and handling assembly 11.

In FIG. 2, the cutting and handling assembly 11 is shown in working inside the core shroud 6 fastened in coaxial position in the vessel 4 of the nuclear reactor.

The cutting and handling assembly 11 comprises a shaft 14 which is fastened in vertical position to the end of the lifting cable 10. A grasping and clamping assembly 15 is mounted on the upper part of shaft 14, a retaining assembly 16 on the lower part of the shaft, and a cutting tool 17 in an intermediate position between the upper assembly 15 and the lower assembly 16.

The assemblies 15 and 16 are formed in a substantially identical way and are arranged substantially symmetrically in relation to a horizontal plane passing through the axis 18 of the cutting tool 17.

The assemblies 15 and 16 each comprise a base 15a (or 16a) and a shank 15c (or 16c) which are fastened to the shaft 14, and an actuating head 15b (or 16b) fixed to a jack rod mounted movably in the corresponding shank 15c (or 16c).

At least two clamping rods 20 and 20' (or 21 and 21') are mounted in an articulated manner on the base 15a (or 16a) of the corresponding assembly 15 (or 16) in directions substantially perpendicular to the axis of the vertical shaft 14.

On the outer end of each of rods 20, 20', 21, 21' opposite their ends articulated about a horizontal axis on the corresponding base 15a or 16a is mounted a pad 22, 22', 23, 23' articulated about a horizontal axis.

Actuating rods 24, 24' or 25, 25' are mounted in an articulated manner on actuating heads 15b and 16b and at their other end are engaged by means of a sliding bearing on the corresponding clamping rod 20, 20', 21, 21'.

By actuating the jack of the assemblies 15 or 16 in one direction, the assemblies can be clamped within the core shroud 6 by forcing pads 22 and 22' or 23 and 23' against the inner surface of the core shroud 6 by means of the actuating rods and clamping rods.

Actuating the jacks in the opposite direction effects the release of the pads of the clamping assemblies, which are then slightly distanced from the inner surface of the shroud 6.

The cutting tool 17 comprises a tool body 17a which is mounted rotatably about the axis of the shaft 14, as indicated by the arrow 27, by means of bearings interposed between the bases 15a and 16a of the assemblies 15 and 16 and a rotary-drive motor device.

The cutting tool 17 comprises a shaft 28 mounted for sliding movement in the direction of the axis 18 of the tool and associated with a device for translational movement in either direction over a radial distance d.

To execute the cutting of the core shroud 6 of a water-cooled nuclear reactor, distance d is generally about 100 mm..

The outer end of the arm 28 carries a circular saw blade 30 fixed to a shaft driven in rotation by a geared motor.

The circular saw blade 30 and its rotary-drive shaft are fastened to a yoke mounted in an articulated manner about a horizontal axis-at the end of the arm 28. The yoke supporting saw blade 30 comprises blocking means making it possible to place the blade 30 either in the horizontal position shown in solid lines in FIG. 2, or in a vertical position 30' shown in broken lines.

The cutting of the portions 12 of the shroud 6 is carried out with the blade 30 in horizontal position.

In its vertical position 30', the blade 30 makes it possible to cut connecting structures of the core shroud 6 and accessory elements, such as toroids for feeding the core with cooling water.

After dismounting and compacting of the upper core grid and the lower core grid as described above, the cutting and handling assembly 11 is placed inside the shroud 6 by the lifting means 9. The clamping pads 22, 22', 23 and 23' of the assemblies 15 and 16 are in a retracted position, so as to make it possible to introduce the assembly 11 into the core shroud 6.

The clamping of the assembly 11 inside the shroud 6 is subsequently effected by means of the pads by actuating the jacks of the clamping assemblies 15 and 16.

The circular saw blade 30 placed in its horizontal position is arranged at a height h below the upper edge of the core shell 6, and the height h can, for example, be of the order of one meter corresponding to the height of a portion 12 which has been cut.

The body 17a of the cutting tool 17 and the circular saw blade 30 are set in rotation about the vertical axis of the shaft 14.

The arm 28 is moved outwards, so as to advance the circular saw blade 30 in the direction of the inner surface of the core shroud 6 and according to the thickness of this core shroud. A cut 31 is thus made in the shell of core 6 in a horizontal plane having a perfectly defined position.

After the cut 31 has been made, allowing a portion 12 of the core shroud 6 to be detached, the jack of the lower clamping assembly 16 is actuated so as to permit release of the pads 23 and 23'.

The portion 12 which remains fastened to the assembly 11 by means of the upper clamping device 15 can be transported and deposited in the compacting press 34, as described above. The release of the clamping assembly 15 is carried out so as to separate the assembly 11 from the portion 12.

The assembly 11 is put back in place inside the core shroud 6, in order to carry out the cutting of a new portion 12, of which the height set by the position of the assembly 11 is determined by the structure of the internal equipment of the reactor.

Between two operations of cutting a portion 12, it is possible to place the circular saw blade in its vertical position 30' in order to carry out the cutting of auxiliary members of the internal equipment, such as toroids for feeding the reactor core with cooling water. The fragments of the internal equipment produced during these cutting operations in the vertical direction are picked up by a handling device making it possible to transport them into the compacting press or, in the case of small-size fragments, directly into a transport and storage container 37.

This ensures the cutting of all the internal equipment of the reactor, followed by compacting of the fragments obtained, in such a way that at least one dimension of the compacted fragments is less than 400 mm, and finally the disposal of the compacted fragments inside a storage and transport container.

At the end of the operations of cutting and removing the internal equipment of the reactor, the pool 3 and the vessel well 2 are decontaminated before cutting and removal of the metal forming the vessel 4 for example by the process described in French Patent Application 90-08117 filed by the present applicant on Jun. 27, 1990.

The process according to the invention makes it possible to dismantle all the internal equipment of a nuclear reactor with a reduced generation of small-size radioactive waste, which it would prove difficult to remove from the water of the pool.

The cutting and handling assembly may have a structure other than one described.

Likewise, the compacting press can have any shape and size adapted to the shape and size of the fragments of the internal equipment extracted from inside the vessel.

Finally, the process and apparatus according to the invention may be used for dismantling the internal equipment of any water-cooled nuclear reactor.

We claim:

1. Process for dismantling the internal equipment of a water-cooled nuclear reactor comprising a cylindrical core shroud arranged in a coaxial position inside a cylindrical vessel having its axis vertical, said process comprising the steps of
   (a) making successive cuts of the core shroud underwater, inside the reactor vessel, in horizontal planes, so as to provide elements of the core shroud which are in the form of cylindrical portions;
   (b) successively extracting each of the cylindrical portions obtained from the vessel; and
   (c) for each of the portions, compacting the portion extracted from the vessel underwater and placing the compacted portion in a storage container.

2. Process according to claim 1, wherein the portions extracted from the vessel are compacted in the vicinity of the lower part of a pool, into which opens a vessel well in which the vessel is placed.

3. Process according to claim 1 or 2, wherein the compacted portions have at least one dimension less than 400 mm.

4. Apparatus for dismantling a core shroud of a water-cooled nuclear reactor, said apparatus comprising
   (a) an assembly for cutting and handling portions of the core shroud, comprising a shaft fastened to a lifting element in a vertical position, a first clamping means mounted on an upper part of the shaft, second clamping means mounted on a lower part of the shaft, and a cutting tool mounted for rotation on the shaft about its axis and arranged said first and second clamping means;
   (b) between at least one radioactive-waste storage means located on the bottom of the pool; and
   (c) a lifting and handling device comprising the lifting element, to which the cutting and handling assembly is fastened, so as to carry out the cutting of portions of the core shroud inside the vessel and the transport of the portions obtained into a compacting press.

5. Apparatus according to claim 4, wherein each of the clamping assemblies comprises a base fastened to the shaft, at least two clamping rods mounted in an articulated manner on the bases of each of the clamping means, an actuating head connected to a movable part of a jack fixed to the base of the corresponding assembly, and at least two actuating rods connected in an articulated manner to the actuating heads of each of the assemblies and engaged slidably on the clamping rods in order to move the clamping rods, carrying bearing pads at their end opposite the base, on which they are articulated, between a clamping position of the pads against the surface of the internal equipment and a released position by means of the actuating heads connected to the movable parts of the jacks.

6. Apparatus according to claim 5, wherein the cutting tool comprises a tool body mounted for rotation on the shaft about its axis and an arm mounted slidably in the body in a direction perpendicular to the axis of rotation of the body on the shaft.

7. Apparatus according to claim 6, wherein a circular saw blade is mounted at the end of the arm, so as to be capable of being placed selectively in a horizontal position perpendicular to the axis of the shaft or in a vertical position parallel to this axis.

* * * * *